United States Patent
Collins

[11] Patent Number: 6,148,913
[45] Date of Patent: Nov. 21, 2000

[54] OIL AND GAS FIELD CHEMICALS

[75] Inventor: Ian Ralph Collins, Sunbury on Thames, United Kingdom

[73] Assignee: BP Chemicals Limited, London, United Kingdom

[21] Appl. No.: 09/128,624

[22] Filed: Aug. 4, 1998

Related U.S. Application Data

[63] Continuation of application No. PCT/GB97/03553, Dec. 24, 1997.

[30] Foreign Application Priority Data

Jan. 13, 1997 [GB] United Kingdom ............... 9700532

[51] Int. Cl.$^7$ ............... E21B 43/12; E21B 43/22
[52] U.S. Cl. ............ 166/263; 166/279; 507/261; 507/928
[58] Field of Search ............... 166/244.1, 263, 166/279, 300, 310, 371; 252/180; 507/261, 904, 927, 928

[56] References Cited

U.S. PATENT DOCUMENTS

| | | | |
|---|---|---|---|
| 3,402,770 | 9/1968 | Messenger. | |
| 3,654,993 | 4/1972 | Smith et al. | 166/279 |
| 4,357,248 | 11/1982 | Berkshire et al. | 166/279 X |
| 4,393,938 | 7/1983 | Lawson et al. | 166/279 |
| 4,602,683 | 7/1986 | Meyers | 166/279 |
| 5,002,126 | 3/1991 | Carlberg et al. | 166/279 |
| 5,141,655 | 8/1992 | Hen | 166/279 X |
| 5,346,010 | 9/1994 | Adams et al. | 166/279 |
| 5,426,258 | 6/1995 | Thomas et al. | 585/15 |
| 5,655,601 | 8/1997 | Oddo et al. | 166/279 |
| 5,690,174 | 11/1997 | Chapman et al. | 166/279 X |
| 5,762,138 | 6/1998 | Ford et al. | 166/279 |

FOREIGN PATENT DOCUMENTS

| | | |
|---|---|---|
| WO 9424413 | 10/1994 | WIPO. |
| WO 9622451 | 7/1996 | WIPO. |

*Primary Examiner*—George Suchfield
*Attorney, Agent, or Firm*—Nixon & Vanderhye

[57] ABSTRACT

This invention is a process and a formulation for minimising the squeezing and shut-in operations needed to inhibit scale in a production well using the precipitation squeeze method by injecting into an oil-bearing rock formation a water-miscible formulation comprising: (a) a water-miscible surfactant which is in liquid form, (b) a solution of water-soluble metal salt comprising a multivalent cation and (c) a solution of a water-miscible scale-inhibiting compound comprising an anionic component capable of forming a scale-inhibiting precipitate in situ in the presence of the cations in (b) upon injection into the rock formation, wherein the surfactant is a glycol ether and the minimum ion concentration of the scale inhibiting compound (c) is 50 ppm based on the total weight of the formulation.

34 Claims, No Drawings

OIL AND GAS FIELD CHEMICALS

This is a continuation of PCT application PCT/GB97/03553, filed Dec. 24, 1997.

This invention relates to oil field chemicals in particular oil field production chemicals and their use.

BACKGROUND OF THE INVENTION

Among oil field chemicals are scale inhibitors, which are used in production wells to stop scaling in the reservoir rock formation matrix and/or in the production lines downhole and at the surface. Scaling not only causes a restriction in pore size in the reservoir rock formation matrix (also known as 'formation damage') and hence reduction in the rate of oil and/or gas production but also blockage of tubular and pipe equipment during surface processing. To overcome this, the production well is subjected to a so called "shut-in" treatment whereby an aqueous composition comprising a scale inhibitor is injected into the production well, usually under pressure, and "squeezed" into the formation and held there. In the squeeze procedure, scale inhibitor is injected several feet radially into the production well where it is retained by adsorption and/or formation of a sparingly soluble precipitate. The inhibitor slowly leaches into the produced water over a period of time and protects the well from scale deposition. The "shut-in" treatment needs to be done regularly e.g. one or more times a year at least if high production rates are to be maintained and constitutes the "down time" when no production takes place. One such method is that described in U.S. Pat. No. 5,002,126 in which a water-soluble surfactant metal salt containing a terminal metal ion is injected down the wellbore and into the reservoir, the surfactant is adsorbed on the surfaces of the reservoir, and thereafter an aqueous solution containing a scale inhibitor capable of reacting with the surfactant is injected into the reservoir so as to form a metal inhibitor which slowly dissolves in water produced from the reservoir. Over the year there is a reduction in total production corresponding to the number of down times during the squeeze/shut-in operation, as well as reduced production as the scaling problem builds up. However, in some instances the scale inhibitor is poorly retained within the reservoir rock formation matrix and short squeeze lifetimes are experienced. The net result in these cases is frequent well interventions which impact on both well productivity and field profitability. One method of alleviating this kind of problem is claimed and described in our prior published WO 96/22451 which relates primarily to adsorption of the scale inhibitor on to the surface of the reservoir rock formation matrix susceptible to scale deposition. In this latter document, the surfactant is so chosen that the retention period of the scale inhibitor on the surface so treated is extended, ie the speed with which the inhibitor is dissolved by produced water is reduced, and consequently the frequency of well intervention is reduced considerably.

Another approach to alleviate the same problem using substantially similar scale squeeze/shut-in technique is to precipitate the scale inhibitor of low water solubility on to the surface susceptible to scale deposition. One such method is described in U.S. Pat. No. 4,357,248. According to this publication, a subterranean reservoir is treated by injecting into it a self-reactive inhibitor solution which subsequently precipitates a scale inhibitor of low water solubility on the relevant surfaces of the reservoir rock formation matrix. In this process, an anionic scale inhibitor and a multivalent cation salt are dissolved in an alkaline aqueous liquid to provide a solution which contains both scale-inhibiting anions and multivalent cations which are mutually soluble as the alkaline pH, but which, at a lower pH and the temperature of the reservoir are precipitated as a scale inhibiting compound having an effective but relatively low water solubility. At least one compound which reacts at a relatively slow rate to reduce the pH of the alkaline solution is also dissolved in the solution. The rate at which the pH of the solution is reduced is adjusted, by arranging the composition and/or concentration of the compounds dissolved in the solution to correlate the rate of pH reduction with the temperature and injectivity properties of the well and reservoir. This is the so called "precipitation squeeze" method.

DESCRIPTION OF THE INVENTION

It has now been found that by choice of a specific surfactant and by controlling the amount of such surfactant used, not only is the performance of the precipitation squeeze method significantly enhanced, but surprisingly, this enhancement is far superior to the performance of the same surfactant when used in an adsorption scale squeeze method.

Accordingly, the present invention is a process for minimizing the number of squeezing and shut-in operations needed to inhibit scale and thereby increase the production rate from an oil well using the precipitation squeeze method, said process comprising injecting into an oil-bearing rock formation matrix a water-miscible formulation comprising:

(a) a water-miscible surfactant which is in liquid form, (b) a solution of a water-soluble metal salt comprising a multivalent cation and (c) a solution of a water-miscible scale-inhibiting compound comprising an anionic component capable of forming a scale inhibiting precipitate in situ in the presence of cations of (b) upon injection into in the rock formation matrix, wherein the surfactant (a) is a glycol ether and the minimum ion concentration of the scale inhibiting compound (c) is 5000 ppm based on the weight of the total formulation, said components (a)–(c) being introduced either as a pre-formed single homogeneous composition, or simultaneously in parallel or sequentially in either order into the rock formation matrix.

The glycol ether is suitably an alkyl glycol ether in which the alkyl group may be straight or branched chain and suitably has 3–6 carbon atoms, preferably from 3–5 carbon atoms. The glycol ethers that may be used is suitably a mono alkyl ether such as eg n-butyltriglycol ether (also known as triethylene glycol mono-n-butyl ether). More specifically, these glycol ethers include inter alia one or more of Ethylene glycol mono ethyl ether
Ethylene glycol mono-n-propyl ether
Ethylene glycol mono-iso-propyl ether
Ethylene glycol mono-n-butyl ether
Ethylene glycol mono-isobutyl ether
Ethylene glycol mono-2-butyl ether
Ethylene glycol mono-tert-butyl ether
Diethylene glycol mono-n-propyl ether
Diethylene glycol mono-iso-propyl ether
Diethylene glycol mono-n-butyl ether
Diethylene glycol mono-isobutyl ether
Diethylene glycol mono-2-butyl ether
Diethylene glycol mono-tert-butyl ether
Diethylene glycol mono-n-pentyl ether Diethylene glycol mono-2-methylbutyl ether
Diethylene glycol mono-3-methylbutyl ether
Diethylene glycol mono-2-pentyl ether
Diethylene glycol mono-3-pentyl ether
Diethylene glycol mono-tert-pentyl ether
Triethylene glycol mono butyl ether (n-butyltriglycol ether)
Tetraethylene glycol mono butyl ether (n-butyltetraglycol ether) and
Pentaethylene glycol mono butyl ether (n-butylpentaglycol ether).

The water-soluble metal salt (b) comprising multivalent cations is suitably a water-soluble salt of a metal from Group II or Group VI of the Period Table. More specifically, these are suitably salts of one or more metals selected from copper, calcium, magnesium, zinc, aluminium, iron, titanium, zirconium and chromium. Since the salts must be water-soluble, they are preferably the halides, nitrates, formates and acetates of these metals. In choosing the relevant metal care must, however, be taken to ensure that the conditions in the rock formation matrix are not such as to cause scaling by one of these metals. Calcium chloride, magnesium chloride or mixtures thereof is preferred. The solution of the water soluble salt is suitably an aqueous solution.

The water-miscible scale-inhibiting compound (c) comprising an anionic component capable of forming in the presence of cations of (b) a scale inhibiting precipitate in situ upon injection into in the rock formation matrix many be any of those well known in the art. The precipitate formed in situ is particularly effective in stopping calcium and/or barium scale with threshold amounts rather than stoichiometric amounts. The minimum ion concentration (hereafter "MIC") of the scale inhibiting compound (c) used is at least 5000 ppm based on the total weight of the formulation, and is suitably at least 10000 ppm, preferably at least 12000 ppm by weight. The scale inhibiting compound (c) may be a water-soluble organic molecule having at least 2 carboxylic and/or phosphonic acid and/or sulphonic acid groups e.g. 2–30 such groups. Preferably, the scale inhibiting compound (c) is an oligomer or a polymer, or may be a monomer having at least one hydroxyl group and/or amino nitrogen atom, especially in a hydroxycarboxylic acid or hydroxy or aminophosphonic, or, sulphonic acid. Examples of compounds (c) are aliphatic phosphonic acids having 2–50 carbons, such as hydroxyethyl diphosphonic acid, and aminoalkyl phosphonic acids, e.g. polyaminomethylene phosphonates with 2–10 N atoms e.g. each bearing at least one methylene phosphonic acid group; examples of the latter are described further in published EP-A-479462, the disclosure of which is herein incorporated by reference. Other scale inhibiting compounds are polycarboxylic acids such as lactic or tartaric acids, and polymeric anionic compounds such as polyvinyl sulphonic acid and poly(meth)acrylic acids, optionally with at least some phosphonyl or phosphinyl groups as in phosphinyl polyacrylates. The scale inhibitors are suitably at least partly in the form of their alkali metal salts e.g. sodium salts. A comprehensive list of such chemicals are listed in the prior published EP-A-O 459171 and these are included herein by reference. More specifically, examples of (c) include one or more of:

polyphosphino carboxylic acids
polyacrylic acids
polymaleic acids
other polycarboxylic acids or anhydrides such as eg
 maleic anhydride, itaconic acid, fimaric acid, mesaconic acid & citraconic acid,
polyvinyl sulphonates
co- and ter-polymers of the above eg
 polyvinyl sulphonate-polyacrylic acid copolymers
 polyvinyl sulphonate-polyacrylic acid-polymaleic acid terpolymers
 polyvinyl sulphonate-polyphosphino carboxylic acid copolymers,
phosphonates
poly(aminoethylenephosphonic acids) such as eg
 aminotrimethylene phosphonic acid
 ethylenediamine tetramethylene phosphonic acid
 nitrilotri(methylene phosphonic acid)
 diethylenetriamine penta(methylene phosphonic acid)
 N,N'-Bis(3-aminobis(methylene phosphonic acid) propyl)
 ethylenediamine bis(methylene phosphonic acid)
1-hydroxyethylidene-1,1-diphosphonic acid
organophosphate esters such as eg
 phosphate esters of polyols containing one or more 2-hydroxyethyl groups, and
phosphomethylated polyamines.

It is stated above that one of the ways of controlling the formation of the precipitate of the scale-inhibiting compound in situ is to control the pH of the solution of the compound from its original value at which value the compound stays in solution to that at which pH value when it generates in situ a precipitate of the scale inhibitor when in contact with the component (b). This may be achieved by various means. For instance, depending upon the nature of the components (a)–(c) introduced into the rock formation in order to generate a solution thereof:

i) If, the aqueous system surrounding the rock formation matrix is relatively highly acidic and therefore of a low pH value, then it may be necessary to inject into such a rock formation matrix solutions of (b) and (c) which are relatively alkaline and also maintain the components in a dissolved state at that pH value prior to injection into the rock formation matrix. Thus, when the two solutions come into contact with each other inside the rock formation matrix and under the prevailing conditions of pH and temperature, they deposit a precipitate of the scale inhibitor in situ on the surface(s) of the rock formation matrix.

ii) If, however, the aqueous system surrounding the rock formation matrix is relatively less acidic or even alkaline and therefore of a relatively high pH value, it may be necessary to inject into such a rock formation matrix solutions of (b) and (c) which are relatively acidic highly acidic and also maintain the components in a dissolved state at that pH value prior to injection into the rock formation matrix. Thus, in this instance also when the two solutions come into contact with each other inside the rock formation matrix and under the prevailing conditions of pH and temperature, they deposit a precipitate of the scale inhibitor in situ on the surface(s) of the rock formation matrix.

When using some combinations of (b) and (c) especially when the aqueous system surrounding the rock formation matrix has a relatively less acidic or even an alkaline pH such as that described in (ii) above, it may be necessary to inject into the formation a solution of a further compound which is heat sensitive and is capable of decomposing under the thermal conditions in the rock formation matrix to generate a basic compound and thereby influencing the prevalent pH in the rock formation to facilitate the formation of precipitate of the scale inhibitor in situ. Examples of such heat sensitive compounds include urea and derivatives thereof.

Thus, according to a specific embodiment, the present invention is a formulation comprising in an aqueous medium (d) at least one surfactant comprising n-butyltriglycol ether in an amount of 1–45% w/w of the total formulation (e) a solution of a water-soluble metal salt comprising a multivalent cation capable of generating in situ a precipitate when combined with the anion of a scale inhibiting compound (f) under the conditions prevalent in the rock formation matrix and (f) a solution of a water-miscible scale-inhibiting compound in an amount of 1–25% w/w of the total formulation and comprising an anionic component capable of forming the scale inhibiting precipitate in situ in the presence of (e) upon injection into in the rock formation matrix, wherein the minimum ion concentration of the scale inhibiting compound (f) is 5000 ppm based on the total weight of the formulation.

It would be apparent that where the components of the formulation can be introduced simultaneously but separately, or, sequentially, or as a pre-formed single composition care should be taken in choosing the components to ensure that they do not form any significant amounts of a precipitate, especially of the scale inhibitor. In the sequential introduction of components (a), (b) and (c), the injected glycol ether (a) may, in most instances, 'move' at a lower velocity than the scale inhibitor forming components (b) & (c). In such a case, a double slug deployment system could be used. For instance, a slug of glycol ether (a) could be injected into the formation first, followed by a slug of scale inhibitor forming components (b) & (c). The two slugs could then be overflushed into the near wellbore in the usual way that scale squeeze treatments are performed. Optionally, a spacer of seawater can be placed between the two slugs of the main treatment, and in this case, the overflush could be sized to achieve mixing of the two slugs in the reservoir (assuming that the relative velocities of the glycol ether (a) and the scale inhibitor forming components (b) & (c) are known). It is preferable that each of the components used is homogeneous in itself and is also water-miscible.

Thus, the surfactant is suitably present in the formulation in an amount ranging from 1–45% by weight, preferably from 5 to 25% by weight, more preferably from 5 to 15% by weight. In the present invention it is possible to use by-product streams from glycol ether manufacturing processes which contain a high proportion of glycol ethers such as eg n-butyltriglycol ether. One such by-product stream comprises about 75% w/w of n-butyltriglycol ether, about 2.5% w/w of n-butyldiglycol ether, about 19% of n-butyl tetraglycol ether and about 2% of n-butyl pentaglycol ether. The relative proportions of components (a)–(c) in the formulation may vary within wide ranges depending upon whether the components are introduced into the rock formation matrix simultaneously, sequentially or as a pre-formed single composition consistent with the need to maintain homogeneity prior to injection thereof into the rock formation matrix. For instance, at relatively higher concentrations of the surfactant or at relatively higher temperatures or extremely low temperatures, it is possible that a pre-formed formulation loses its homogeneity due to reduced solubility of one or more components in the formulation under those conditions. In these instances, small amounts of a solubilizing agent such as eg a lower aliphatic alcohol, especially methanol or ethanol, can either be added to the inhomogeneous pre-formed formulation or used to partially replace the surfactant in the formulation to restore the homogeneity of the formulation.

Thus, the homogeneous, pre-formed formulations of the present invention may contain, in addition to the glycol ether, a cosolvent such as eg a lower aliphatic alcohol, especially methanol or ethanol.

The aqueous medium in the formulation may be from fresh, tap, river, sea, produced or formation water, with a total salinity of eg 0–250 g/l such as 5–50 g/l and may have a pH of 0.5–9. Where sea water is used, the formulation may have a highly acidic pH in the region of 0.1 to 1.5 if a highly acidic scale inhibiting compound (c) is used. In such cases it may be necessary to neutralise the acidity of the formulation by using an alkali metal hydroxide, especially sodium hydroxide, potassium hydroxide or lithium hydroxide in order to ensure homogeneity of the formulation. It has been found for instance that use of lithium hydroxide as a neutralising agent instead of the other alkali metal hydroxides allows tolerance of relatively higher levels of the surfactant in the formulation when it is required to maintain homogeneity of the formulation.

The amount of the scale inhibiting compound used is at least 5000 ppm, suitably at least 10000 ppm, and is in the range from 1–25% w/w of the total formulation, suitably from 5–15% w/w, preferably from 6–10% w/w. Within these ranges the amount used would depend upon the nature of the chemical used and its intended purpose, the nature of the rock formation matrix and that it is consistent with the components of the formulation being water miscible and homogeneous.

It is important with the formulations of the present invention that they remain a clear and stable over a temperature range from ambient to least about 45° C. However, within the concentration ranges of the components specified above, it is possible to devise formulations which remain stable over a much wider temperature range eg from ambient to the temperature of the production well (eg from 90 to about 150° C., especially around 110° C.) into which the formulation is introduced. In the present invention, when the components of the formulation are injected under pressure into the production well or rock formation matrix either as a pre-formed formulation, simultaneously or sequentially, the scale inhibitors precipitate in situ on the surface(s) of the reservoir rock formation matrix and are retained for relatively long periods. By using a relatively small molecule such as a glycol ether, especially a C3–C6(alkyl)triglycol ether as the surfactant, use of big surfactant molecules (having>C6 alkyl groups) are avoided thereby minimizing any risk of surfactant aggregates being formed which in turn may result in high viscosity emulsions causing blockage of the wells.

Thus, such a formulation may contain, in addition, other components such as (x) other production chemicals or (y) cosolvents which, when necessary, enable the formulation to remain stable at relatively higher temperatures or when the surfactant is used in concentrations in the upper quartile of the range specified. However, such formulations should be substantially free of water-immiscible components.

The pre-formed homogeneous formulations of the present invention, when used, may be suitably made by adding the glycol ether surfactant (a) to an aqueous solution of the scale inhibitor forming compounds (b) & (c) followed by gentle mixing. If the material made initially is cloudy, then minor adjustments to the relative proportions of the ingredients or a change in the nature or amount of the cosolvent used or the temperature will be needed. Their viscosity is suitably such that at the reservoir temperature, eg at 100° C., they are easy to pump downhole. The pre-formed formulations of the present invention may be prepared via a concentrate of ingredients (a), (b) and (c), which can be transported as such to the site of use, where it is mixed with the aqueous medium in appropriate proportions to achieve the desired homogeneity and into which the chemical has been dissolved. The components can be injected, suitably under pressure, into an oil bearing zone, eg rock formation matrix, via a producing well e.g. down the core, followed by a separate liquid to force the components of the formulation into the oil bearing zone; the liquid may be used as an overflush and can be sea water or diesel oil. The components of the formulation are then left ("shut-in") in the oil bearing zone while oil production is stopped temporarily. A desirable shut-in period is 5–50 hrs e.g. 10–30 hrs. During this process, the injected components of the formulation percolate through the oil bearing zone under the injection pressure. In the shut-in period, the injected components of the formulation comes into contact with reservoir fluids and form in situ a precipitate of the scale inhibitor which is deposited on the surface (s) of the reservoir rock formation matrix. This is the so called "precipitation squeeze" effect which precipitate inhibits scale deposition and furthermore is not readily leached out by the production water thereby maintaining continuous oil recovery from such zones. After this period the oil production can be re-started. In the case the oil production rate will be initially high, as will the soluble calcium content of the produced water. Over time, e.g. several months, the rate of production may decrease and the scale inhibitor content of the production water may also decrease signifying possible scaling problems in the rock formation, whereupon the production can be stopped and fresh aliquot of the components of the formulation injected into the well. Similar methods can be used to achieve asphaltene inhibition, wax inhibition or dispersion and hydrogen sulphide scavenging, while for corrosion and gas hydrate inhibition, the formulation is usually injected continuously downhole.

A further feature of the formulations of the present invention is that when a precipitate of the scale-inhibitor is used, oil and the glycol ether are recovered at the surface, ie above ground level, after the above procedure of precipitation squeeze and upon subsequent cooling thereof, most of the glycol ether enters in the aqueous phase rather than the oil phase of this composition. Thus, the glycol ether does not cause any problems either in subsequent production or refining operations such as contributing to any haze formation in fuels due to the presence of solubilized water in the glycol ether. Moreover, if the separated aqueous phase is discharged into the sea, then biodegradation of dissolved glycol ether can be relatively rapid in the thermal layer of the sea thereby minimising pollution. Furthermore, the formulations of the present invention can increase the effectiveness of the scale inhibitor by at least two-fold, so that less chemical would be usually needed per year and the down time due to application of the chemical and shut-in would also be correspondingly reduced thereby increasing the production rate.

The process can be operated equally efficiently by injecting the components of the formulation sequentially into the production well.

EXAMPLES

The present invention is illustrated in the following Examples.

Example 1

1.1 The precipitation squeeze technique of inhibiting scale deposition was tested out in a set of laboratory coreflood experiments. The general procedure was as follows: A core plug (3.8 cm×15.25 cm, sampled from the Brent Group, Forties Field, sandstone) to simulate a rock formation of an oil well was mounted in a Hassler-type core holder. This was miscibly cleaned with a sequence of solvents including methanol, toluene and water at ambient temperature. The mounted core plug was then saturated with formation brine and permeability to brine at room temperature was measured. The plug was then saturated with dead crude oil (ex Forties Field, North Sea) and heated to 107° C., left at that temperature for 24 hours. A low rate waterflood was performed at this temperature to restore the core plug to residual oil saturation ($S_{or}$), i.e. no more oil could be extracted. The core plug was then cooled to room temperature. 2 pore volumes of a 15% by weight solution of a glycol ether mixture, PCP 96-44 (see below for composition of the glycol ether mixture), in sea water was then injected into the core plug. The temperature of the plug was then raised again to 107° C. and the plug left at that temperature for 6 hours. Thereafter, 8 pore volumes of a slug of the scale inhibiting compound (c) admixed with the metal salt (b) dissolved in sea water was injected at temperature and the core left shut-in at temperature for a further 12 hours. After shut-in, the core was post-flushed with sea-water. The results of the coreflood are tabulated below:

Specifically, the scale inhibiting compound (c) used was Dequest® 2060S* (ex Monsanto which is a solution of diethylene triamine pentamethylene phosphonic acid), dissolved in sea water. For the precipitation product, the concentration of the scale inhibiting compound (c) was 12628 ppm of active inhibiting compound and 2000 ppm of calcium ion (b) as $CaCl_2.6H_2O$ was added to effect precipitation. The calcium addition was followed by adjustment of the pH to 4.0. In the precipitation baseline (control) case, the active inhibiting compound concentration was 12000 ppm at pH 4.5. A further test was also carried out to compare the performance of the method of the present invention (hereafter abbreviated as "ENHANCED") with the conventionally used adsorption method. For the adsorption method, the same Dequest® 2060S scale inhibiting compound was used but at an active concentration of 12000 ppm at pH 2) to give an adsorption baseline. It is worth noting that the lower pH 2 of the adsorption baseline, in fact, favours the enhanced retention of the scale inhibitor compared with the relatively higher pH value used for the method of the invention. The post flush brine consisted of:

| Ion | Composition (mg/l) |
| --- | --- |
| Na | 31275 |
| Ca | 5038 |
| Mg | 739 |
| K | 654 |
| $SO_4$ | 0 |
| Cl | 60848 |
| Sr | 771 |
| Ba | 269 |

The surfactant PCP 96-44 had the following composition:
n-Butyltriglycol ether 75% w/w
n-Butyldiglycol ether 2.5% w/w
n-Butyltetraglycol ether 19.0% w/w
n-Butylpentaglycol ether 2.0

COREFLOOD RESULTS

TABLE 1

| No. Pore Vols | PRECIPITATION BASELINE Inhibitor Conc (ppm) | ADSORPTION BASELINE Inhibitor Conc (ppm) | "ENHANCED" Inhibitor Conc (ppm) (INVENTION) |
|---|---|---|---|
| 10 | 110 | 85 | 253 |
| 50 | 74 | 61 | 24 |
| 100 | 53 | 48 | 37 |
| 150 | 40 | 39 | 26 |
| 200 | 23 | 28 | 28 |
| 250 | 20 | 23 | 25 |
| 300 | 15 | 18.7 | 18.5 |
| 350 | 13 | 14.4 | 18 |
| 400 | 12.5 | 12 | 16 |
| 500 | 10 | 8.2 | 18 |
| 600 | 8 | 5.2 | 16 |
| 700 | 7.5 | 0 | 15 |
| 800 | 7 | 0 | 15 |
| 1000 | 7.5 | 0 | 16 |
| 1050 | 6 | 0 | 15.5 |
| 1100 | 5 | 0 | 15 |
| 1150 | 3.5 | 0 | 14.8 |
| 1500 | 0 | 0 | 8.4 |
| 2000 | 0 | 0 | 6.7 |
| 2200 | 0 | 0 | 6.6 |

The improvement achieved by the process of the present invention can be summarised as function of minimum inhibitor concentration as shown below:

| Minimum Inhibitor Concentration (MIC) | Baseline Pptn relative to adsorption baseline | Enhanced pptn relative to adsorption baseline | Enhanced precipitation relative to precipitation baseline |
|---|---|---|---|
| 10 | 1.05 | 2.7 | 2.6 |
| 5 | 1.8 | >3.7 | >2 |

Example 2

The precipitation squeeze technique of inhibiting scale deposition was tested out in a set of laboratory coreflood experiments. The general procedure was as follows: A core plug (2.54 cm (1 inch)×7.62 cm (3 inches), sampled from the Magnus Main sandstone) to simulate a rock formation of an oil well was mounted in a Hassler-type core holder. This was cleaned with a sequence of mild solvents including alternate injection of toluene and methanol at ambient temperature to remove any hydrocarbons or polar components present in the core sample. The spiked brine was injected into the core at 120 ml/hr and the resulting effluent stream sampled in 2 ml aliquots. The mounted core plug was then saturated with Magnus formation brine at 120 ml/hr for three hours and permeability to brine at room temperature was measured. The Magnus formation brine was spiked with 50 ppm lithium tracer to determine the Clean Pore Volume of the core sample. A plot of the normalised lithium concentration was then used to determine the effective pore volume by determining the volume of brine injected when the lithium concentration was at half the normalised value, and subtracting the known dead volume of the system. Absolute liquid permeability of the core was determined by heating the core to 116° C., and then by flooding the core sample at 0, 30, 60, 90 and 120 ml/hr. The slope of the plot of the differential pressure across the core against the flow rate was used to calculate permeability following Darcy's equation, $K = A\,\Delta P / L\,\mu$. The plug was then saturated with dead crude oil (ex Magnus Field, North Sea, filtered and de-gassed) by injecting the oil into the sample at 120 ml/hr for a period of 1 hour heated to 116° C. and left at that temperature for 24 hours. The permeability to oil (at $S_{wc}$) was then measured using the same procedure as above. The crude oil was displaced from the core by flooding with Magnus formation water at reservoir temperature [116° C.] and at a flow rate of 120 ml/hr. A permeability measurement of $S_{or}$ was then made. Two pore volumes of a 15% by weight solution of the squeeze enhancing surfactant ESP2000 ( which is a glycol ether mixture, also known as PCP-96-44, identified above) were then injected into the core plug sample using synthetic sea water specified above. The core plug was then cooled to 80° C. for a period of at least 18 hours. A 2.5% by weight active Scaletreat® XL14FD (an active polyrnaleate scale inhibitor, ex TR Oil Services Ltd, Dyce, Aberdeen) sea water solution was injected into the core at 60 ml/hour. The inlet lines were flushed clean and bled up to the core face with the flowback (also known as "post-flush") brine (50:50 Formation water:Sea water) prior to increasing the oven temperature to 116° C. The fluids within the core sample were then shut-in for 24 hours. The inhibitor solution was spiked with a 50 ppm lithium tracer to allow determination of the effective liquid pore volume at this stage of the test. After shut-in, the core was post-gushed with a 50:50 formation water: sea water mixture (flowback brine) which was injected into the core at 60 ml/hr for approximately 2400 volumes. The permeability to 50:50 brine was then determined using the same procedure as before. The core was flooded with crude oil at 120 ml/hr for 1 hour; the permeability to oil was then determined. On completion of the flowback (post-flush), the sample was re-cleaned using toluene and methanol, and saturated with Magnus formation water; the final permeability to formation water was then measured. Following permeability measurement, methanol was passed through the sample, prior to dismantling the apparatus, removing the core sample and drying. Scanning Electron Microscope (SEM) analysis was carried out on the post-test sample, and compared with a pre-test sample. The upstream plug face from the actual test sample was used as the post-test specimen. The pieces were mounted on standard aluminium stubs using colloidal graphite as the cement, with the freshly broken faces uppermost. The fresh sample faces were then coated with gold using a sputter coater. Photomicrographs were taken under secondary electron (SE) and backscatter electron (BSE) imaging conditions. Phase identification was aided by use of energy disperse X-ray (EDX) analysis. The results of the coreflood are in Table 2 tabulated below.

Specifically, the scale inhibiting compound used was a proprietary formulation Scaletreat® XL 14FD (which generated an active polymaleate in situ) as follows: The solutions of the maleate and a low acidity calcium chloride were injected into the rock formation matrix. Thereafter a thermally decomposable compound, urea, was introduced into the rock formation which decomposed under the temperature conditions prevalent in the rock formation matrix thereby generating a basic compound which raised the pH of the solutions and generated a precipitate of the active polymaleate compound in situ. The brines used had the ions listed in the table below present:

| | Composition mg/liter | |
|---|---|---|
| Ion | Formation Water | Synthetic Water |
| $Na^+$ | 11034 | 10890 |
| $K^+$ | 210 | 460 |
| $Mg^{2+}$ | 70 | 1328 |
| $Ca^{2+}$ | 250 | 428 |
| $Ba^{2+}$ | 220 | 0 |
| $Sr^{2+}$ | 45 | 0 |
| $Cl^-$ | 17350 | 19700 |
| $HCO_3^-$ | 1100 | 124 |
| $SO_4^-$ | 0 | 2960 |

Note: The $Fe^{2+}$ concentration in each case was 0
Sulphate was removed from the sea water used for manufacture of the 50:50 (Formation water: Sea water) brine, and replaced with equal moles of NaCl.
Brines were degassed prior to pH adjustment to a value of 6.1.

COREFLOOD RESULTS

TABLE 2

| No. Pore Vols | PRECIPITATION BASELINE Inhibitor Conc (ppm) | "ENHANCED" Inhibitor Conc (ppm) (INVENTION) |
|---|---|---|
| 10 | 1000 | 1000 |
| 50 | 100 | 300 |
| 100 | 40 | 70 |
| 150 | 25 | 50 |
| 200 | 9.5 | 30 |
| 250 | 8.0 | 28 |
| 300 | 6.0 | 20 |
| 350 | 5.6 | 10 |
| 400 | 5.0 | 9.0 |
| 500 | 3.8 | 8.6 |
| 600 | 3.0 | 8.0 |
| 700 | 2.7 | 6.0 |
| 800 | 1.0 | 3.2 |
| 1000 | 0.9 | 2.5 |
| 1050 | 0.9 | 2.4 |
| 1100 | 0.88 | 2.0 |
| 1150 | 0.83 | 1.8 |
| 1500 | 0.45 | 1.0 |
| 2000 | 0 | 0.45 |
| 2200 | 0 | 0.40 |

The improvement achieved by the process of the present invention can be summarized as function of minimum inhibitor concentration as shown below:

| Minimum Inhibitor Concentration (MIC) | Enhanced pptn relative to precipitation baseline |
|---|---|
| 10 | 1.75 |
| 5 | 1.90 |
| 1 | 1.90 |

The permeability measurements carried out during this work were averaged over a number of flow rates. The initial permeability to brine of the clean sample was measured at 98 mD [represents milli Darcy]. This value dropped to 27 mD at residual oil saturation prior to inhibitor application, in line with expectations. On completion of the flowback stage of the test, this value had risen to 69 mD. This rise was probably due to the removal of a minor quantity of crude oil from the sample during inhibitor application. On completion of the test, the permeability to brine of the re-cleaned sample was found to be 86 mD.

Two oil permeability measurements were also made during the core flood. The first of these, taken at connate water saturation was measured as 30 mD. At residual oil saturation, at the end of the test, the permeability to oil had dropped to 21 mD.

Analysis of the permeability measurements shows that there has been a small reduction in liquid permeability as a result of the test work. It seems likely that the reduction in permeability seen would have occurred as a result of barite scale deposition within the test sample. This theory is supported by SEM analysis of the post-test sample. Scale deposition may have taken place during the end of the flowback phase of the test, as the inhibitor concentration fell below the minimum inhibitor concentration (MIC) for the scaling environment. The permeability reduction may therefore be regarded as an artefact of the test methodology, as during field application, further squeeze treatments would prevent such conditions occurring.

The results of the test indicate that the squeeze lifetime at high and low MIC values has been doubled, through incorporation of ESP2000 into the test procedure. By combining the squeeze enhancing chemical with the enhanced precipitation scale inhibitor, based on an MIC of 10 ppm active, a lifetime in the order of 6 times that of the conventional adsorption-only treatment was attained.

What is claimed is:

1. A process for minimizing the number of squeezing and shut-in operations needed to inhibit scale and thereby increase the production rate from an oil well using the precipitation squeeze method, said process comprising injecting into an oil-bearing rock formation matrix a water-miscible formulation comprising:
    (a) a water-miscible surfactant which is a glycol ether in liquid form,
    (b) a solution of water-soluble metal salt comprising a multivalent cation, and
    (c) a solution of a water-miscible scale-inhibiting compound comprising an anionic component capable of forming a scale inhibiting precipitation in situ in the presence of the cations in (b) upon injection into the rock formation matrix, wherein the minimum ion concentration of the scale inhibiting compound (c) is 5,000 ppm based on the total weight of the formulation, said components (a)–(c) being introduced either as a preformed single homogeneous composition, or simultaneously or sequentially in either order into the rock formation matrix.

2. A process according to claim 1 wherein the glycol ether is an alkyl glycol ether in which the alkyl group is straight or branched chain and has 3–6 carbon atoms.

3. A process according to claim 1 wherein the glycol ether comprises one or more ethers selected from the group consisting of:
    Ethylene glycol mono ethyl ether
    Ethylene glycol mono-n-propyl ether
    Ethylene glycol mono-iso-propyl ether
    Ethylene glycol mono-n-butyl ether
    Ethylene glycol mono-isobutyl ether
    Ethylene glycol mono-2-butyl ether
    Ethylene glycol mono-tert-butyl ether
    Diethylene glycol mono-n-propyl ether
    Diethylene glycol mono-iso-propyl ether
    Diethylene glycol mono-n-butyl ether
    Diethylene glycol mono-isobutyl ether
    Diethylene glycol mono-2-butyl ether Diethylene glycol mono-tert-butyl ether Diethylene glycol mono-n-pentyl ether Diethylene glycol mono-2-methylbutyl ether Diethylene glycol mono-3-methylbutyl ether Diethylene glycol mono-2-pentyl ether Diethylene glycol mono-3-pentyl ether Diethylene glycol mono-tert-pentyl ether Triethylene glycol mono butyl ether (n-butyltriglycol ether)

Tetraethylene glycol mono butyl ether (n-butyltetraglycol ether) and

Pentaethylene glycol mono butyl ether (n-butylpentaglycol ether).

4. A process according to claim 1 wherein the water-soluble metal salt (b) comprising multivalent cations is a salt of a metal from Group II or Group VI of the Period Table.

5. A process according to claim 1 wherein the water-soluble metal salt (b) is a salt of one or more metals selected from the group consisting of copper, calcium, magnesium, zinc, aluminium, iron, titanium, zirconium and chromium.

6. A process according to claim 1 wherein the water-soluble metal salt (b) is selected from the group consisting of the halides, nitrates, formates and acetates of the metals.

7. A process according to claim 1 wherein the water-soluble metal salt (b) is calcium chloride, magnesium chloride or mixtures thereof.

8. A process according to claim 1 wherein the solution of the water-soluble metal salt (b) is an aqueous solution.

9. A process according to claim 1 wherein the water-miscible scale-inhibiting compound (c) comprising an anionic component capable of forming in the presence of the cations in (b) a scale inhibiting precipitate in situ upon injection into in the rock formation matrix is a water-soluble organic molecule having at least two (i) carboxylic acid groups and/or (ii) phosphonic acid groups and/or (iii) sulphonic acid groups.

10. A process according to claim 9 wherein compound (c) has from 2–30 carboxylic acid and/or phosphonic acid and/or sulphonic acid groups.

11. A process according to claim 1 wherein the scale inhibiting compound (c) is an oligomer or a polymer, or, is a monomer with at least one hydroxyl group and/or amino nitrogen atom.

12. A process according to claim 11 wherein compound (c) is a hydroxycarboxylic acid, a hydroxy- or amino-phosphonic acid, or, a sulphonic acid.

13. A process according to claim 12 wherein compound (c) is selected from the group consisting of:

polyphosphino carboxylic acids polyacrylic acids polymaleic acids other polycarboxylic acids or anhydrides polyvinyl sulphonates and co- and ter-polymers thereof phosphonates poly(aminoethylenephosphonic acids)

1-hydroxyethylidene-1,1-diphosphonic acid organophosphate esters and phosphomethylated polyamines.

14. A process according to claim 12 wherein compound (c) is selected from the group consisting of:

lactic acid, citric acid, tartaric acid, maleic anhydride, itaconic acid, fumaric acid, mesaconic acid, citraconic acid, polyvinyl sulphonate-polyacrylic acid copolymers, polyvinyl sulphonate-polyacrylic acid-polymaleic acid terpolymers, polyvinyl sulphonate-polyphosphino carboxylic acid copolymers, aminotrimethylene phosphonic acid, ethylenediamine tetramethylene phosphonic acid, nitrilotri(methylene phosphonic acid), diethylenetriamine penta(methylene phosphonic acid), N,N'-Bis[3-aminobis(methylene phosphonic acid) propyl] ethylenediamine bis (methylene phosphonic acid) and phosphate esters of polyols containing one or more 2-hydroxyetbyl groups.

15. A process according to claim 12 wherein compound (c) is an aliphatic phosphonic acid having 2–50 carbons.

16. A process according to claim 15 wherein compound (c) is a polyaminomethylene phosphonate having 2–10 N atoms each of the nitrogen atoms bearing at least one methylene phosphonic acid group.

17. A process according to claim 1 wherein the scale inhibiting compound (c) is at least partly in the form of its alkali metal salt.

18. A process according to claim 1 wherein the minimum ion concentration of the scale inhibiting compound (c) used is at least 10000 ppm based on the total weight of the formulation.

19. A process according to claim 1 wherein the pH value of the formulation is so controlled that prior to introduction thereof into the rock formation matrix the components of the formulation are in solution whereas upon injection into the rock formation matrix and under the conditions of pH and temperature prevalent or created in said matrix, the pH of the solution varies to a value so as to generate in situ a precipitate of the scale inhibitor when compound (c) is in contact with the compound (b).

20. A process according to claim 19 wherein:

a. the solution comprising compounds (b) and (c) in the fonnulation is highly acidic and b. the aqueous system surrounding the rock formation matrix has a relatively less acidic or an alkaline pH insufficient to enable precipitation of the scale inhibitor in situ upon injection of the formulation into the rock formation matrix, whereby c. injecting into the rock formation matrix a solution of a further compound which is heat sensitive and is capable of decomposing under the thermal conditions in the rock formation matrix so as to generate a basic compound thereby influencing the prevalent pH in the rock formation to facilitate the formation of precipitate of the scale inhibitor in situ.

21. A process according to claim 20 wherein heat sensitive compound is urea or a derivative thereof.

22. A process according to claim 1 wherein components (a), (b) and (c) are sequentially introduced into the rock formation matrix, such that a slug of glycol ether (a) is injected into the formation matrix first, followed by a slug of scale inhibitor forming components (b) & (c), optionally placing a spacer of seawater between the two slugs of the main treatment.

23. A formulation comprising in an aqueous medium (a) at least one surfactant comprising n-butyltriglycol ether in an amount of 1–45% w/w of the total formulation, (b) a solution of a water-soluble metal salt comprising a multivalent cation and (c) a solution of a water-miscible scale-inhibiting compound in an amount of a 1–25% w/w of the total formulation and comprising an anionic component capable of forming the scale inhibiting precipitate in situ in the presence of the cations of (b) upon injection into a rock formation matrix, wherein the minimum ion concentration of the scale inhibiting compound (c) in said formulation is at least 5,000 ppm based on the total weight of the formulation.

24. A formulation according to claim 23 wherein the surfactant (d) is present in the formulation in an amount ranging from 1–45% by weight.

25. A formulation according to claim 23 wherein the surfactant (d) is a by-product stream from a glycol ether manufacturing processes which stream contains a high proportion of an n-alkyl triglycol ether.

26. A formulation according to claim 23 wherein the n-alkyl triglycol ether is n-butyltriglycol ether and the by-product stream comprises about 75% w/w of n-butyltriglycol ether, about 2.5% w/w of butyldiglycol ether, about 19% of butyl tetraglycol ether and about 2% of butyl pentaglycol ether.

27. A formulation according to claim 23 wherein said formulation is a homogeneous solution optionally comprising small amounts of a solubilizing agent to maintain the homogeneity of the solution during storage and transportation thereof.

28. A formulation according to claim 27 wherein the solubilizing agent is a lower aliphatic alcohol which is present in an amount sufficient to maintain the homogeneity of the formulation in solution.

29. A formulation according to claim 26 wherein the solubilising agent is methanol or ethanol.

30. A formulation according to claim 23 wherein the aqueous medium in the formulation is derived from fresh, tap, river, sea, produced or formation water, with a total salinity ranging from 0–250 g/l.

31. A formulation according to claim 30 wherein the salinity of the aqueous medium is from 5–50 g/l.

32. A formulation according to claim 23 wherein said formulation in aqueous medium has a pH value in the range from 0.5–9.

33. A formulation according to claim 23 wherein the amount of the scale inhibiting compound used is at least 5000 ppm and is in the range from 1–25% w/w of the total formulation.

34. A formulation according to claim 23 wherein the amount of the scale inhibiting compound used is at least 5000 ppm and is in the range from 5–15% w/w of the total formulation.

* * * * *